(12) United States Patent
Iseri et al.

(10) Patent No.: US 11,167,612 B2
(45) Date of Patent: Nov. 9, 2021

(54) VEHICLE SUSPENSION DEVICE

(71) Applicant: MAZDA MOTOR CORPORATION, Hiroshima (JP)

(72) Inventors: Haruaki Iseri, Hiroshima (JP); Tetsuya Shirosaka, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 118 days.

(21) Appl. No.: 16/636,039

(22) PCT Filed: Aug. 3, 2018

(86) PCT No.: PCT/JP2018/029231
§ 371 (c)(1),
(2) Date: Feb. 3, 2020

(87) PCT Pub. No.: WO2019/027041
PCT Pub. Date: Feb. 7, 2019

(65) Prior Publication Data
US 2021/0046795 A1 Feb. 18, 2021

(30) Foreign Application Priority Data

Aug. 3, 2017 (JP) .............................. JP2017-150587

(51) Int. Cl.
*B60G 13/04* (2006.01)
*B60G 3/20* (2006.01)
*B60G 7/00* (2006.01)

(52) U.S. Cl.
CPC ............... *B60G 13/04* (2013.01); *B60G 3/20* (2013.01); *B60G 7/00* (2013.01);
(Continued)

(58) Field of Classification Search
CPC . B60G 3/20; B60G 7/00; B60G 13/04; B60G 99/00; B60G 2200/144;
(Continued)

(56) References Cited

U.S. PATENT DOCUMENTS

| 6,170,242 B1 * | 1/2001 | Gordon | .................. | A01D 34/64 |
| | | | | 280/124.141 |
| 11,065,929 B2 * | 7/2021 | Gordon | .................. | B60G 17/00 |

FOREIGN PATENT DOCUMENTS

| EP | 0406885 A2 * | 1/1991 | ........... B62D 25/088 |
| JP | H0585133 A * | 4/1993 | ............. B60G 7/006 |

(Continued)

OTHER PUBLICATIONS

International Preliminary Report on Patentability and Written Opinion issued in PCT/JP2018/029231; dated Feb. 4, 2020.
(Continued)

*Primary Examiner* — Paul N Dickson
*Assistant Examiner* — Scott F. Underwood
(74) *Attorney, Agent, or Firm* — Studebaker & Brackett PC

(57) ABSTRACT

Provided is a vehicle suspension device capable of obtaining excellent steering stability and good riding comfort in conformity to a tire longitudinal spring constant. The suspension device (1) comprises: an upper arm (2); a lower arm (4); a wheel support (8); and a shock absorber (12) having an upper end attached to a vehicle body (B) of a vehicle and a lower end attached to the lower arm, wherein the upper arm and the lower arm are arranged such that a ratio $\zeta_{scuff}$ of a scuff change-based apparent damping coefficient $C_{scuff}$ to a critical damping coefficient $C_C$ of the suspension device becomes equal to or greater than a lower limit, under the condition that the vehicle is traveling straight ahead on a flat road at a given vehicle speed, wherein the scuff change-
(Continued)

based apparent damping coefficient $C_{scuff}$ is obtained by dividing, by a stroke speed of a wheel, an up-down directional component of a vehicle width-directional force arising on a ground contact surface of the wheel due to a vehicle width-directional displacement of the wheel occurring along with a stroke of the wheel, and the lower limit is set such that it becomes larger as a tire longitudinal spring constant of the wheel becomes smaller.

5 Claims, 2 Drawing Sheets

(52) U.S. Cl.
CPC .... *B60G 2200/462* (2013.01); *B60G 2202/23* (2013.01); *B60G 2400/25* (2013.01)

(58) Field of Classification Search
CPC .......... B60G 2200/462; B60G 2202/23; B60G 2202/25; B60G 2204/14; B60G 2206/99; B60G 2400/25
See application file for complete search history.

(56) References Cited

FOREIGN PATENT DOCUMENTS

| | | | | |
|---|---|---|---|---|
| JP | 11094661 A | * | 4/1999 | |
| JP | 2002192930 A | * | 7/2002 | |
| JP | 2002205522 A | * | 7/2002 | ........... B60G 21/051 |
| JP | 2006044467 A | * | 2/2006 | |
| JP | 2006062505 A | * | 3/2006 | |
| JP | 2007-230517 A | | 9/2007 | |
| JP | 2010264940 A | * | 11/2010 | |
| WO | WO-9108918 A1 | * | 6/1991 | ............. B62D 17/00 |
| WO | WO-2014064501 A | * | 5/2014 | ........... B60G 17/016 |
| WO | WO-2019027041 A1 | * | 2/2019 | ................ B60G 3/20 |

OTHER PUBLICATIONS

International Search Report issued in PCT/JP2018/029231; dated Sep. 4, 2018.

* cited by examiner

VEHICLE SUSPENSION DEVICE

TECHNICAL FIELD

The present invention relates to a vehicle suspension device, and more particularly to a vehicle suspension device configured to generate a change in scuff (scuff change) with stroke.

BACKGROUND ART

Heretofore, with a view to obtaining excellent steering stability and good riding comfort, various suspension devices have been studied. For example, in a suspension device described in the following Patent Document 1, one end and the other end of a damper are coupled, respectively, to a vehicle body and a rocker link swingably coupled to a suspension arm, and the rocker link is coupled to a knuckle through a camber control arm and coupled to the vehicle body through a rocker arm, whereby a relation of a damper stroke to a wheel stroke becomes non-linear. This makes it possible to, when the wheel stroke is relatively small, enhance riding comfort, and, when the wheel stroke is relatively large, suppress a roll behavior of the vehicle body to enhance steering stability.

CITATION LIST

Patent Document

Patent Document 1: JP 2007-230517A

SUMMARY OF INVENTION

Technical Problem

Meanwhile, from a viewpoint of satisfying both of an improvement in fuel economy performance based on a reduction in tire rolling resistance, and an improvement in driving/braking and turning performances based on an increase in tire friction force during driving/braking and during turning, it is desirable to promote an increase in tire ground contact area based on an increase in tire ground contact width according to an increase in vertical load on each wheel, while suppressing deformation of a torus of a tire tread portion.

Specifically, an increase in rigidity of the torus of the tire tread portion or a reduction in rigidity of a tire sidewall structure makes it possible to suppress the deformation of the torus of the tire tread portion during coasting, thereby reducing the tire rolling resistance. However, if the technique of increasing the rigidity of the torus of the tire tread portion or reducing the rigidity of the tire sidewall structure is performed by itself, the increase in tire ground contact area according to an increase in vertical load on each wheel during driving/braking and during turning is suppressed, resulting in deterioration in the driving/braking and turning performances. Therefore, an out-of-plane bending rigidity of the tire tread portion is reduced to allow the tire ground contact width to be more easily increased according to an increase in vertical load on each wheel during driving/braking and during turning, so that it is possible to linearly increase the tire ground contact area in response to an increase in vertical load on a wheel, even in a tire configured such that the rigidity of a torus of a tire tread portion thereof is increased. That is, a technique of increasing the rigidity of the torus of the tire tread portion and reducing a tire spring constant in an up-down direction (tire longitudinal spring constant) makes it possible to satisfy both of an improvement in fuel economy performance based on a reduction in tire rolling resistance, and an improvement in driving/braking and turning performances based on an increase in tire friction force during driving/braking and during turning.

On the other hand, when the tire longitudinal spring constant is reduced, up-down directional damping performance is also deteriorated, so that, when the tire passes over a joint or groove in a road, a deficiency in an up-down directional damping force of the tire causes difficulty in converging vibration, resulting in deterioration in riding comfort.

Specifically, the aforementioned conventional techniques are based on the assumption that a tire conforming to properties of a vehicle body and a suspension device of a vehicle is selected, or the properties of a tire are determined in conformity to the properties of the vehicle body and the suspension device. Thus, if the vehicle employs a tire which has become unable to conform to the properties of the vehicle body and the suspension device as a result of deterioration in up-down directional damping performance caused by a decrease in the tire longitudinal spring constant, it cannot cope with the deterioration in up-down directional damping performance of the tire and fails to sufficiently obtain advantageous effects expected in the conventional techniques, such as improvements in riding comfort and steering stability.

That is, from a viewpoint of satisfying both of significant improvements in fuel economy performance and driving/braking and turning performances, it is desirable to largely reduce the tire up-down directional (vertical) spring constant. However, this technique involves significant deterioration in steering stability performance and riding comfort performance, so that it has not been able to be employed in a vehicle equipped with a conventional vehicle body structure and a conventional suspension device.

The present invention has been made to solve the above conventional problem, and an object thereof is to provide a vehicle suspension device capable of obtaining excellent steering stability and good riding comfort, in conformity to the tire longitudinal spring constant.

Solution to Technical Problem

In order to achieve the above object, the present invention provides a vehicle suspension device configured to generate a scuff change with stroke. The vehicle suspension device comprises: a plurality of coupling members each swingably coupled to a vehicle body of a vehicle in an up-down direction; a wheel supporting member coupled to the coupling members and rotatably supporting a wheel; and a shock absorber extending in a vehicle up-down direction and having an upper end attached to the vehicle body and a lower end attached to one of the coupling members or the wheel supporting member, wherein the coupling members are arranged such that a ratio of a scuff change-based apparent damping coefficient to a critical damping coefficient of the suspension device becomes equal to or greater than a given lower limit and equal to or less than a given upper limit, under a condition that the vehicle is traveling straight ahead on a flat road at a given vehicle speed, wherein the scuff change-based apparent damping coefficient is obtained by dividing, by a stroke speed of the wheel, an up-down directional component of a vehicle width-directional force arising on a ground contact surface of the wheel due to a vehicle width-directional displacement of the wheel occurring along with a stroke of the wheel with respect to the vehicle body, and wherein the lower limit is set such that it becomes larger as a tire longitudinal spring constant of the wheel becomes smaller.

In the vehicle suspension device of the present invention having the above feature, the coupling members are arranged such that the ratio of the scuff change-based apparent damping coefficient to the critical damping coefficient of the suspension device becomes equal to or greater than a given lower limit and equal to or less than a given upper limit, under the condition that the vehicle is traveling straight ahead on a flat road at a given vehicle speed, wherein the lower limit of the ratio of the scuff change-based apparent damping coefficient to the critical damping coefficient of the suspension device is set such that it becomes larger as the tire longitudinal spring constant of the wheel becomes smaller. Thus, by setting the ratio of the scuff change-based apparent damping coefficient to the critical damping coefficient of the suspension device to be equal to or less than the upper limit, it is possible to prevent the rate of a damping force based on a scuff change during stroke of the wheel from becoming excessively high, thereby ensure smooth stroke of the suspension device. Further, by setting the ratio of the scuff change-based apparent damping coefficient to the critical damping coefficient of the suspension device to be equal to or greater than the lower limit, it is possible to set the rate of the damping force based on the scuff change during stroke of the wheel, in conformity to the tire longitudinal spring constant, so as not to become deficient in the total up-down directional damping force of the tire and the suspension device. This makes it possible to obtain excellent steering stability and good riding comfort in conformity to the tire longitudinal spring constant.

Preferably, in the vehicle suspension device of the present invention, an apparent spring constant K at a position of a wheel axle is expressed as the following formula (1), and the ratio $\zeta_{scuff}$ of the apparent damping coefficient to the critical damping coefficient is expressed as the following formula (2):

$$K[N/m] = \frac{C_p \frac{4h^2}{T^2 V} \times X' + C_p \frac{2h\varepsilon}{T} \times X + k \times X + C_p \frac{2h\alpha}{T}}{X} \quad (1)$$

$$\zeta_{scuff} = \frac{C_p \frac{4h^2}{T^2 V}}{2\sqrt{MK}}, \quad (2)$$

where: T denotes a tread of the vehicle; h denotes a roll center height; Cp denotes an equivalent cornering power; V denotes the given vehicle speed; M denotes a sprung mass applied to the wheel; X denotes a stroke amount of the wheel; X' denotes a stroke speed of the wheel; a denotes an initial toe angle; ands denotes a roll steer coefficient.

According to this feature, the ratio $\zeta_{scuff}$ of the scuff change-based apparent damping coefficient to the critical damping coefficient of the suspension device can be easily calculated based on properties of a tire, geometries of the suspension device, and it is possible to determine whether or not the ratio $\zeta_{scuff}$ is equal to or greater than the lower limit and equal to or less than the upper limit.

Preferably, the vehicle suspension device of the present invention includes a rear suspension device in which the lower limit of the ratio $\zeta_{scuff}$ of the scuff change-based apparent damping coefficient to the critical damping coefficient is 0.0299 or more, when the tire longitudinal spring constant of a rear wheel is 213 N/mm or less.

According to this feature, even in a situation where the vehicle is equipped with a tire whose tire longitudinal spring constant is significantly reduced as compared with a conventional tire, it is possible to set the rate of the damping force based on the scuff change during stroke of the wheel, so as not to become deficient in the total up-down directional damping force of the rear tire and the rear suspension device. This makes it possible to obtain excellent steering stability and good riding comfort in conformity to the tire longitudinal spring constant.

Preferably, the vehicle suspension device of the present invention includes a front suspension device in which the lower limit of the ratio $\zeta_{scuff}$ of the scuff change-based apparent damping coefficient to the critical damping coefficient is 0.0034 or more, when the tire longitudinal spring constant of a rear wheel is 213 N/mm or less.

According to this feature, even in the situation where the vehicle is equipped with a tire whose tire longitudinal spring constant is significantly reduced as compared with a conventional tire, it is possible to set the rate of the damping force based on the scuff change during stroke of the wheel, in conformity to the tire longitudinal spring constant, so as not to become deficient in the total up-down directional damping force of the tire and the front suspension device. This makes it possible to obtain excellent steering stability and good riding comfort in conformity to the tire longitudinal spring constant.

Preferably, in the vehicle suspension device of the present invention, the upper limit of the ratio $\zeta_{scuff}$ of the scuff change-based apparent damping coefficient to the critical damping coefficient is 0.042.

According to this feature, it is possible to prevent the rate of the damping force based on the scuff change during stroke of the wheel from becoming excessively high, thereby ensure smooth stroke of the suspension device to realize good riding comfort.

Effect of Invention

The vehicle suspension device of the present invention can obtain excellent steering stability and good riding comfort in conformity to the tire longitudinal spring constant.

DESCRIPTION OF EMBODIMENTS

With reference to the accompanying drawings, a vehicle suspension device according to one embodiment of the present invention will now be described.

Figure 1:
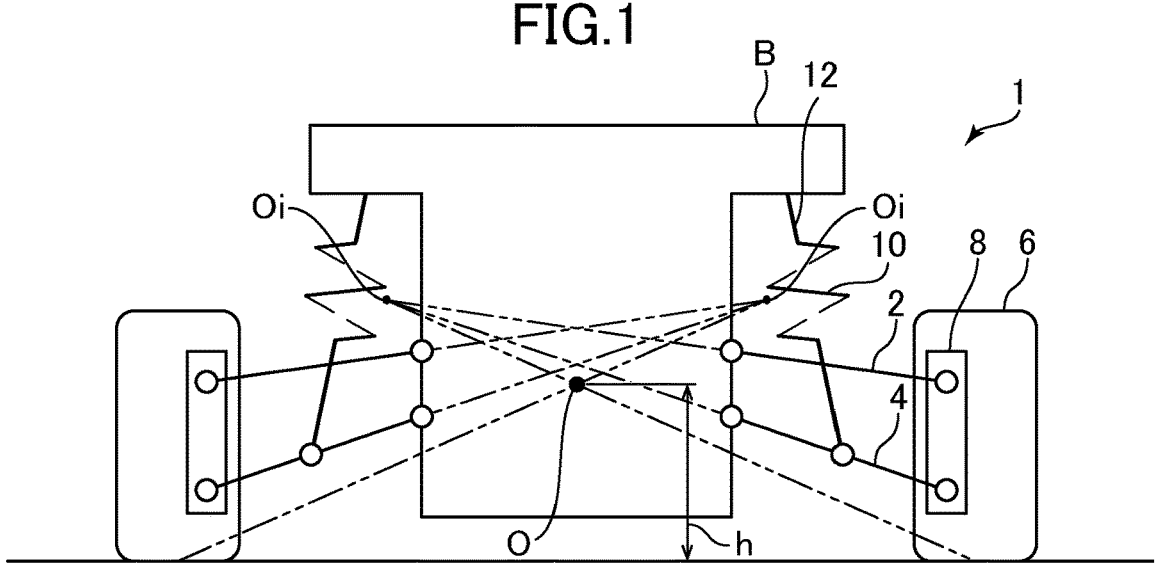
FIG. 1 is a schematic front view of a vehicle suspension device according to one embodiment of the present invention.

First of all, the overall configuration of the vehicle suspension device according to one embodiment will be described with reference to FIG. 1. FIG. 1 is a schematic front view of the vehicle suspension device according to this embodiment.

In FIG. 1, the reference sign 1 designates the vehicle suspension device (hereinafter referred to simply as "suspension") according to this embodiment. The suspension according to this embodiment is a double wishbone suspension in which a wheel support 8 (wheel supporting member) of a wheel 6 is coupled to a vehicle body B of a vehicle swingably or strokeably up and down via an upper arm 2 and a lower arm 4. When each of the upper arm 2 and the lower arm 4 is swung up and down about one end thereof on the side of the vehicle body B, the wheel support 8 and the wheel 6 are stroked up and down along a given trajectory.

Further, a shock absorber 12 comprising a coil spring 10 and a damper (not-shown) is disposed to give an appropriate bias force and damping force while permitting such a stroke of the wheel 6. This shock absorber 12 is configured such that the coil spring 10 and the damper are arranged approximately concentrically. Thus, the shock absorber 12 generally has a cylindrical shape which is long in the up-down direction. An upper end of the shock absorber 12 is attached to the vehicle body B, and a lower end of the shock absorber 12 is pivotally attached to the lower arm or the wheel support 8 (in FIG. 1, to the lower arm 4).

In the suspension illustrated in FIG. 1, an intersection point between a straight line connecting two nodes of the upper arm 2 on respective ones of the sides of the wheel support 8 and the vehicle body B and a straight line connecting two nodes of the lower arm 4 on respective ones of the sides of the wheel support 8 and the vehicle body B is defined as an instantaneous rotation center Oi of the wheel 6 and the wheel support 8 with respect to the vehicle body B. Further, an intersection point between a straight line connecting the instantaneous rotation center Oi and a tire ground contact point of the wheel 6 in a right suspension and a straight line connecting the instantaneous rotation center Oi and a tire ground contact point of the wheel 6 in a left suspension is defined as an instantaneous roll center O.

Figure 2:
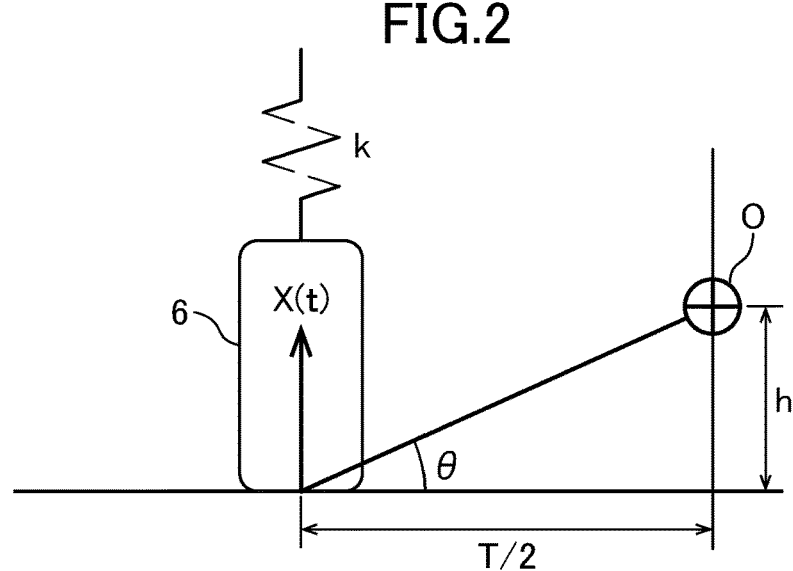
FIG. 2 is a front view showing a model of the vehicle suspension device according to this embodiment.
Figure 3:
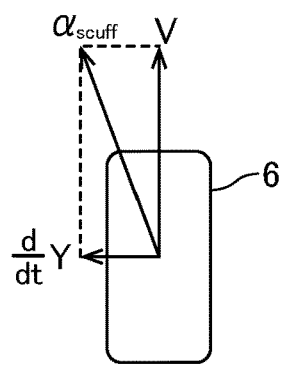
FIG. 3 is a front view showing a model of a wheel.

Next, with reference to FIGS. 2 and 3, an up-down directional force acting on the wheel 6 along with suspension strike in the suspension according to this embodiment will be described. FIG. 2 is a front view showing a model of the suspension, and FIG. 3 is a front view showing a model of the wheel 6.

In the model of the suspension illustrated in FIG. 2, a tread is denoted by T [m], and a roll center height is denoted by h [m]. An inclination angle of a straight line (virtual swing arm) connecting the roll center O and the tire ground contact point of the wheel 6, with respect to a road surface, is denoted by $\theta$ [rad]. For the sake of simplicity, an equivalent cornering power is assumed to be constant at Cp [N/rad], irrespective of fluctuation in tire ground contact load. Further, a wheel center spring constant obtained by converting a spring constant of an elastic force generated by the coil spring 10 and a stabilizer (not-shown) according to the stroke of the wheel 6 with respect to the vehicle body B, to that at a position of a wheel axle is denoted by k [N/m].

[Up-Down Force Based on Scuff Change]

When the stroke of the wheel 6 is expressed by a function of time t, X(t) [m], under the condition that a vehicle equipped with the above suspension is traveling straight ahead on a flat road at a vehicle speed V [m/s], a vehicle width-directional displacement Y [m] of the tire ground contact point of the wheel 6 (, i.e. scuff change Y [m]) is expressed as the following formula:

$$Y[m] = X(t) \times \tan\theta = \frac{2h}{T}X(t)$$

Thus, a scuff change speed dY/dt [m/s] obtained by differentiating the scuff change with respect to time is expressed as the following formula:

$$\frac{d}{dt}Y[m/s] = \frac{2h}{T} \times \frac{d}{dt}X(t)$$

Further, because the vehicle is traveling forwardly at the vehicle speed V [m/s], a traveling direction of the wheel 6 is a direction of a composite vector of a vector of the vehicle speed [m/s] and a vector of the scuff change speed dY/dt [m/s]. That is, due to the scuff change along with the stroke of the wheel 6, a pseudo slip angle $\alpha_{scuff}$ [rad] expressed as the following formula arises in the wheel 6.

$$\alpha_{scuff}[rad] = \frac{1}{V}\frac{d}{dt}Y = \frac{2h}{TV} \times \frac{d}{dt}X(t)$$

A lateral force $F_{y(scuff)}$ [N] to be generated in the wheel 6 according to the pseudo slip angle is expressed as follows, using the aforementioned equivalent cornering power Cp:

$$F_{y(scuff)}[N] = C_p\frac{2h}{TV} \times \frac{d}{dt}X(t)$$

When the lateral force $F_{y(scuff)}$ is divided into a component in a direction along the virtual swing arm, and a component in the up-down direction of the wheel 6, an up-down directional component force (i.e., an up-down force caused by the scuff change) $F_{V(scuff)}$ [N] is expressed as follows:

$$F_{V(scuff)}[N] = C_p\frac{2h}{TV} \times \frac{d}{dt}X(t) \times \tan\theta = C_p\frac{4h^2}{T^2V} \times \frac{d}{dt}X(t)$$

[Up-Down Force Based on Roll Steer]

Further, a steer angle $\alpha_{rs}$ [rad] at the time when the stroke X(t) [m] arises is expressed as follows:

$$\alpha_{rs}[rad] = \varepsilon X(t)$$

, where $\varepsilon$ denotes a roll steer coefficient [rad/m] representing a toe angle change amount of the wheel 6 per unit stroke amount of the suspension.

A lateral force $F_{y(rs)}$ [N] to be generated in the wheel 6 according to the steer angle $\alpha_{rs}$ is expressed as follows, using the aforementioned equivalent cornering power Cp:

$$F_{y(rs)}[N] = C_p\varepsilon X(t)$$

When the lateral force $F_{y(rs)}$ is divided into a component in a direction along the virtual swing arm, and a component in the up-down direction of the wheel 6, an up-down directional component force (i.e., an up-down force caused by roll steer) $F_{V(rs)}$ [N] is expressed as follows:

$$F_{V(rs)}[N] = C_p \varepsilon X(t) \times \tan\theta = C_p \frac{2h\varepsilon}{T} \times X(t)$$

[UP-Down Force Based on Elasticity of Suspension]

An up-down directional elastic force $F_{V(spg)}$ [N] to be generated by the suspension according to the stroke X(t) [m] is expressed as the following formula:

$$F_{V(spg)}[N] = k \times X(t)$$

[Up-Down Force Based on Initial Toe Angle]

Further, a lateral force $F_{y(toe)}$ [N] to be generated in the wheel 6 based on the initial toe angle is expressed as follows, using the aforementioned equivalent cornering power Cp:

$$F_{y(toe)}[N] = C_p \times \alpha$$

, where α denotes an initial toe angle [rad].

When the lateral force $F_{y(toe)}$ is divided into a component in a direction along the virtual swing arm, and a component in the up-down direction of the wheel 6, an up-down directional component force (i.e., an up-down force caused by the initial toe angle) $F_{V(toe)}$ [N] is expressed as follows:

$$F_{V(toe)}[N] = C_p \times \alpha \times \tan\theta = C_p \frac{2h\alpha}{T}$$

[Apparent Spring Constant]

As above, when the stroke of the wheel 6 is X(t) [m], an up-down directional force $F_V = F_{V(scuff)} + F_{V(rs)} + F_{V(spg)} + F_{V(toe)}$ obtained by adding the up-down directional components of the lateral forces acting on the wheel 6, to the elastic force generated by the coil spring 10 and the stabilizer (not-shown) acts on the wheel 6. An apparent spring constant K [N/m] at a position of the wheel axle when the stroke of the wheel 6 is X(t) [m] can be obtained by dividing the above up-down directional force $F_V$ by the stroke X(t), i.e., using the following formula:

$$K[N/m] = \frac{C_p \frac{4h^2}{T^2 V} \times \frac{d}{dt}X(t) + C_p \frac{2h\varepsilon}{T} \times X(t) + k \times X(t) + C_p \frac{2h\alpha}{T}}{X(t)}$$

Here, the up-down force $F_{V(scuff)}$ caused by the scuff change is proportional to a stroke speed dX(t)/dt, as described above. That is, the up-down force $F_{V(scuff)}$ caused by the scuff change can be deemed as a damping force generated according to the stroke speed of the wheel 6. Therefore, an apparent damping coefficient $C_{cuff}$ of the up-down force caused by the scuff change can be obtained by dividing the up-down force $F_{V(scuff)}$ by the stroke speed dX(t)/dt, i.e., using the following formula:

$$C_{scuff} = F_{V(scuff)} / \frac{d}{dt}X(t) = C_p \frac{4h^2}{T^2 V}$$

Further, the apparent damping coefficient $C_{cuff}$ of the up-down force caused by the scuff change may be expressed by a ratio (scuff damping ratio) $\zeta_{scuff}$ of the apparent damping coefficient $C_{cuff}$ of the up-down force caused by the scuff change to an apparent critical damping coefficient $C_C$ of the suspension at the position of the wheel axle. In this case, a scuff change-based damping property can be generalized as the following formula:

$$\zeta_{scuff} = \frac{C_{scuff}}{C_c} = \frac{C_p \frac{4h^2}{T^2 V}}{2\sqrt{MK}}$$

Here, the apparent critical damping coefficient $C_C$ of the suspension at the position of the wheel axle can be obtained as follows:

$$C_C = 2\sqrt{MK}$$

, where M denotes a sprung mass [kg] applied to the wheel.

Next, an upper limit of the scuff damping ratio $\zeta_{scuff}$ will be described with reference to FIG. 4.

Figure 4:
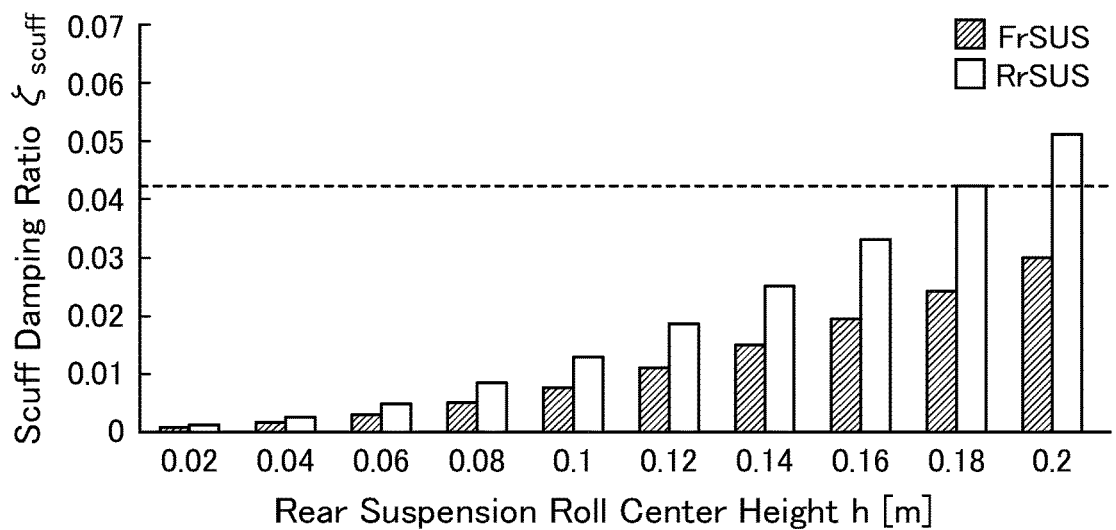
FIG. 4 is a graph showing a relationship between a roll center height and a scuff damping ratio.

FIG. 4 is a graph showing a relationship between the roll center height h and the scuff damping ratio $\zeta_{scuff}$. Specifically, FIG. 4 shows the scuff damping ratio $\zeta_{scuff}$ to be obtained when the wheel 6 is stroked by a stroke amount of 0.003 m at a stroke speed of 0.01 m/s, under the condition that a vehicle in which a front wheel axle load and a rear wheel axle load are, respectively, 850 kg and 600 kg, and each of front and rear treads is 1.6 m is traveling straight ahead at a vehicle speed of 50 km/h. In FIG. 4, the horizontal axis represents the roll center height h in a rear suspension, and the vertical axis represents the scuff damping ratio $\zeta_{scuff}$.

Specifically, in FIG. 4, outlined bars indicate respective values of the scuff damping ratio $\zeta_{scuff}$ in the rear suspension corresponding to various roll center heights h in the rear suspension. Further, shaded bars indicate respective values of the scuff damping ratio $\zeta_{scuff}$ in a front suspension in a case where the roll center height in the front suspension is set to various values.

As above, the scuff damping ratio $\zeta_{scuff}$ can be expressed as a function of the roll center height h, and the scuff damping ratio $\zeta_{scuff}$ becomes larger as the roll center height h becomes larger, as shown in FIG. 4. FIG. 4 also shows that the scuff damping ratio $\zeta_{scuff}$ in the front suspension is smaller than the scuff damping ratio $\zeta_{scuff}$ in the rear suspension.

The present inventor has conducted a sensory evaluation of smoothness of suspension stroke under the condition that the scuff damping ratio $\zeta_{scuff}$ is changed by changing the roll center height h using several kinds of vehicles different in vehicle weight and tread. As a result, the present inventor has obtained knowledge that, in any of the vehicles, when the scuff damping ratio $\zeta_{scuff}$ becomes greater than 0.042, the smoothness of suspension stroke is clearly lost. Thus, by setting the roll center height h and the tread T (specifically, adjusting the size, mounting position and mounting angle of each of the upper arm 2 and the lower arm 4) such that the scuff damping ratio $\zeta_{scuff}$ becomes equal to or less than 0.042, it is possible to allow the suspension to be smoothly stroked so as to realize good riding comfort.

For example, in the example illustrated in FIG. 4, when the roll center height h in the rear suspension is set to 0.18 m or less, the scuff damping ratio $\zeta_{scuff}$ in each of the front suspension and the rear suspension can be suppressed to 0.042 (indicated by the dotted line in FIG. 4) or less.

Next, a lower limit of the scuff damping ratio $\zeta_{scuff}$ will be described with reference to FIGS. 5 and 6.

Figure 5:
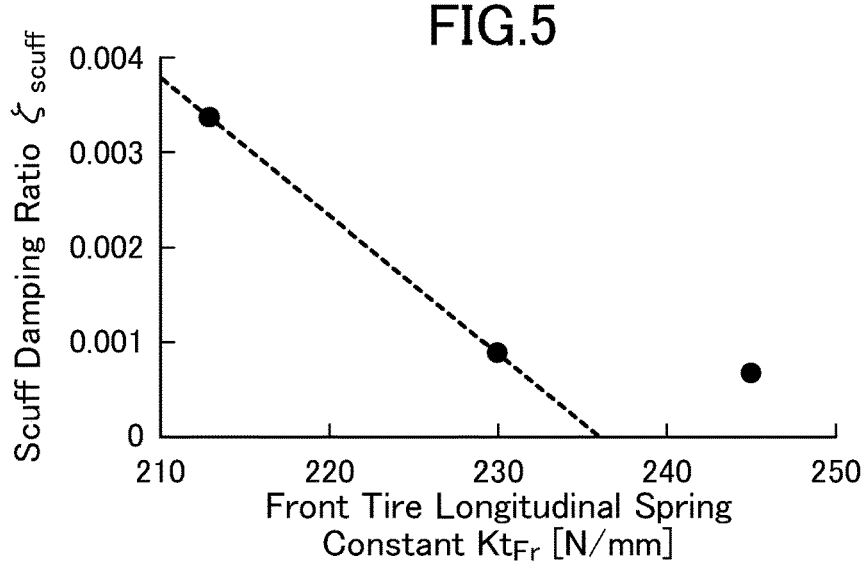
FIG. 5 is a graph prepared by plotting lower limit values of the scuff damping ratio in a front suspension device, necessary to maintain good riding comfort and responsivity, under the condition that the tire longitudinal spring constant of a front tire is variously changed.
Figure 6:
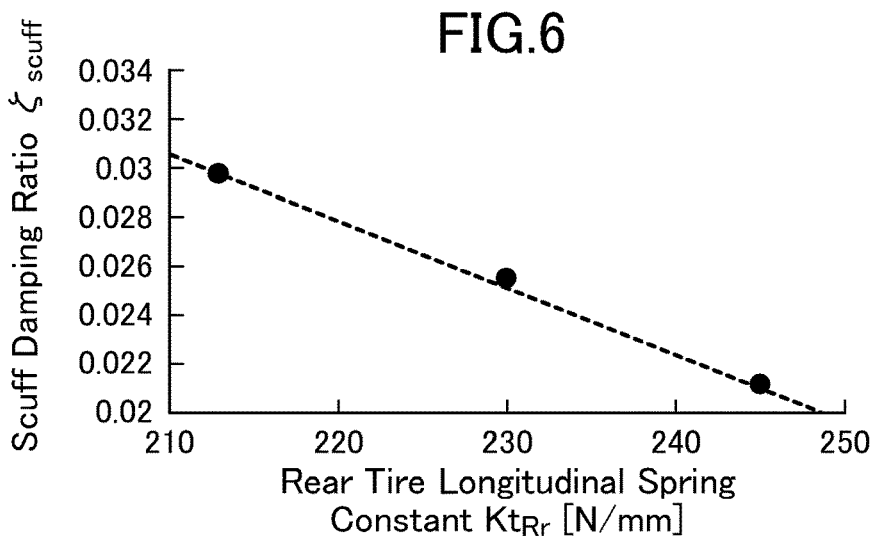
FIG. 6 is a graph prepared by plotting lower limit values of the scuff damping ratio in a rear suspension device, necessary to maintain good riding comfort and responsivity, under the condition that the tire longitudinal spring constant of a rear tire is variously changed.

FIGS. 5 and 6 are graphs each prepared by plotting lower limit values of the scuff damping ratio $\zeta_{scuff}$, which is necessary to maintain good riding comfort and responsivity without deficiency in the total up-down directional damping force of a tire and a suspension, under the condition that the tire longitudinal spring constant of the tire is variously changed, and obtained through a sensory evaluation using several kinds of vehicles different in vehicle weight and tread. FIG. 5 is a graph prepared by plotting lower limit values of the scuff damping ratio $\zeta_{scuff}$ in a front suspension (front tire) under the condition that a tire longitudinal spring constant $kt_{Fr}$ of a tire of a front wheel (front tire) is variously changed. FIG. 6 is a graph prepared by plotting lower limit values of the scuff damping ratio $\zeta_{scuff}$ in a rear suspension under the condition that a tire longitudinal spring constant $kt_{Rr}$ of a tire of a rear wheel (rear tire) is variously changed.

With regard to the front suspension, as shown in FIG. 5, the lower limit of the scuff damping ratio $\zeta_{scuff}$ in the front suspension is 0.0007 when the tire longitudinal spring constant $kt_{Fr}$ of the front tire is 245 [N/mm], and 0.0009 when the tire longitudinal spring constant $kt_{Fr}$ is 230 [N/mm], whereas the lower limit of the scuff damping ratio $\zeta_{scuff}$ in the front suspension has a relatively high value of 0.0034 when the tire longitudinal spring constant $kt_{Fr}$ is largely reduced to 213 [N/mm]. That is, a deterioration in damping performance along with a decrease in the tire longitudinal spring constant can be compensated for by an apparent damping force generated by the scuff change.

From the plots illustrated in FIG. 5, a straight line (indicated by the dotted line in FIG. 5) connecting a point where the tire longitudinal spring constant $kt_{Fr}$ is 230 [N/mm] and the lower limit of the scuff damping ratio $\zeta_{scuff}$ is 0.0009 and a point where the tire longitudinal spring constant $kt_{Fr}$ is 213 [N/mm] and the lower limit of the scuff damping ratio $\zeta_{scuff}$ is 0.0034 is defined as a lower limit line of the scuff damping ratio $\zeta_{scuff}$ in the front suspension according to the tire longitudinal spring constant $kt_{Fr}$ of the front tire. Then, the scuff damping ratio $\zeta_{scuff}$ in the front suspension is set such that a value thereof is located above the lower limit line. In this way, good riding comfort and responsivity can be maintained without deficiency in the total up-down directional damping force of the front tire and the front suspension. As shown in FIG. 5, the lower limit line of the scuff damping ratio $\zeta_{scuff}$ in the front suspension is set such that it becomes larger as the tire longitudinal spring constant $kt_{Fr}$ becomes smaller. This lower limit line is expressed as the following linear function of the tire longitudinal spring constant $kt_{Fr}$ of the front tire: $\zeta_{scuff}=-0.0001\times Kt_{Fr}+0.0351$.

With regard to the rear suspension, as shown in FIG. 6, the lower limit of the scuff damping ratio $\zeta_{scuff}$ in the rear suspension is 0.021 when the tire longitudinal spring constant $kt_{Rr}$ of the rear tire is 245 [N/mm], and 0.0255 when the tire longitudinal spring constant $kt_{Rr}$ is 230 [N/mm], whereas the lower limit of the scuff damping ratio $\zeta_{scuff}$ in the rear suspension has a relatively high value of 0.0299 when the tire longitudinal spring constant $kt_{Rr}$ is largely reduced to 213 [N/mm].

From the plots illustrated in FIG. 6, a straight line (indicated by the dotted line in FIG. 6) connecting a point where the tire longitudinal spring constant $kt_{Rr}$ is 230 [N/mm] and the lower limit of the scuff damping ratio $\zeta_{scuff}$ is 0.0255 and a point where the tire longitudinal spring constant $kt_{Rr}$ is 213 [N/mm] and the lower limit of the scuff damping ratio $\zeta_{scuff}$ is 0.0299 is defined as a lower limit line of the scuff damping ratio $\zeta_{scuff}$ in the rear suspension according to the tire longitudinal spring constant $kt_{Rr}$ of the rear tire. Then, the scuff damping ratio $\zeta_{scuff}$ in the rear suspension is set such that a value thereof is located above the lower limit line. In this way, good riding comfort and responsivity can be maintained without deficiency in the total up-down directional damping force of the rear tire and the rear suspension. As shown in FIG. 6, the lower limit line of the scuff damping ratio $\zeta_{scuff}$ in the rear suspension is set such that it becomes larger as the tire longitudinal spring constant $kt_{Rr}$ becomes smaller. This lower limit line is expressed as the following linear function of the tire longitudinal spring constant $kt_{Rr}$ of the rear tire: $\zeta_{scuff}=-0.0003\times Kt_{Rr}+0.0886$.

Next, a modification of the above embodiment will be described.

Although the above embodiment has been described based on an example where the suspension is a double wishbone suspension, the present invention can also be applied to any other suitable type of suspension in which the tread is changed with stroke (e.g., a multilink suspension, a semi-trailing arm suspension, or a strut-type suspension).

Next, advantageous effects of the vehicle suspension device 1 according to the above embodiment and modified embodiment will be described.

In the above embodiment and modified embodiment, the upper arm 2 and the lower arm 4 are arranged such that the scuff damping ratio $\zeta_{scuff}$, i.e., the ratio of an apparent damping coefficient $C_{sucff}$ of an up-down force caused by a scuff change to the critical damping coefficient $C_C$ of the suspension becomes equal to or greater than a given lower limit and equal to or less than a given upper limit, under the condition that the vehicle is traveling straight ahead on a flat road at a given vehicle speed, wherein the lower limit of the scuff damping ratio $\zeta_{scuff}$ is set such that it becomes larger as the tire longitudinal spring constant of the wheel 6 becomes smaller. Thus, by setting the scuff damping ratio $\zeta_{scuff}$ to be equal to or less than the upper limit, it is possible to prevent the rate of a damping force based on a scuff change during stroke of the wheel 6 from becoming excessively high, thereby ensure smooth stroke of the suspension. Further, by setting the scuff damping ratio $\zeta_{scuff}$ to be equal to or greater than the lower limit, it is possible to set the rate of the damping force based on the scuff change during stroke of the wheel, in conformity to the tire longitudinal spring constant, so as not to become deficient in the total up-down directional damping force of the tire and the suspension. This makes it possible to obtain excellent steering stability and good riding comfort in conformity to the tire longitudinal spring constant.

In the above embodiment and modified embodiment, the apparent spring constant K at the position of the wheel axle is expressed as the following formula (1), and the scuff damping ratio $\zeta_{scuff}$ is expressed as the following formula (2):

$$K[N/m] = \frac{C_p \dfrac{4h^2}{T^2 V} \times X' + C_p \dfrac{2h\varepsilon}{T} \times X + k \times X + C_p \dfrac{2h\alpha}{T}}{X} \quad (1)$$

$$\zeta_{scuff} = \frac{C_p \dfrac{4h^2}{T^2 V}}{2\sqrt{MK}} \quad (2)$$

Thus, the scuff damping ratio $\zeta_{scuff}$ can be easily calculated based on properties of a tire, geometries of the suspension, and it is possible to determine whether or not the scuff damping ratio $\zeta_{scuff}$ is equal to or greater than the lower limit and equal to or less than the upper limit.

In the above embodiment and modified embodiment, the lower limit of the scuff damping ratio $\zeta_{scuff}$ in the rear suspension is 0.0299 or more, when the tire longitudinal spring constant of the rear wheel is 213 N/mm or less. Thus, even in a situation where the vehicle is equipped with a tire whose tire longitudinal spring constant is significantly reduced as compared with a conventional tire, it is possible to set the rate of the damping force based on the scuff change, so as not to become deficient in the total up-down directional damping force of the rear tire and the rear suspension. This makes it possible to obtain excellent steering stability and good riding comfort in conformity to the tire longitudinal spring constant.

In the above embodiment and modified embodiment, the upper limit of the scuff damping ratio $\zeta_{scuff}$ is 0.042. Thus, it is possible to ensure smooth stroke of the suspension to realize good riding comfort.

LIST OF REFERENCE SIGNS

1: suspension device
2: upper arm
4: lower arm
6: wheel
8: wheel support
10: coil spring
12: shock absorber
B: vehicle body
Oi: instantaneous rotation center
O: roll center

The invention claimed is:

1. A vehicle suspension device configured to generate a scuff change with stroke, comprising:
a plurality of coupling members each coupled to a vehicle body swingably in an up-down direction;
a wheel supporting member coupled to the coupling members and rotatably supporting a wheel; and
a shock absorber extending in a vehicle up-down direction and having an upper end attached to the vehicle body and a lower end attached to one of the coupling members or the wheel supporting member,
wherein the coupling members are arranged such that a ratio of a scuff change-based apparent damping coefficient to a critical damping coefficient of the suspension device becomes equal to or greater than a given lower limit and equal to or less than a given upper limit, under a condition that the vehicle is traveling straight ahead on a flat road at a given vehicle speed, wherein the scuff change-based apparent damping coefficient is obtained by dividing, by a stroke speed of the wheel, an up-down directional component of a vehicle width-directional force arising on a ground contact surface of the wheel due to a vehicle width-directional displacement of the wheel occurring along with a stroke of the wheel with respect to the vehicle body, and wherein the lower limit is set such that it becomes larger as a tire longitudinal spring constant of the wheel becomes smaller.

2. The vehicle suspension device as recited in claim 1, wherein an apparent spring constant K at a position of a wheel axle is expressed as the following formula (1), and the ratio $\zeta_{scuff}$ of the scuff change-based apparent damping coefficient to the critical damping coefficient is expressed as the following formula (2):

$$K[N/m] = \frac{C_p \frac{4h^2}{T^2V} \times X' + C_p \frac{2h\varepsilon}{T} \times X + k \times X + C_p \frac{2h\alpha}{T}}{X} \quad (1)$$

$$\zeta_{scuff} = \frac{C_p \frac{4h^2}{T^2V}}{2\sqrt{MK}}, \quad (2)$$

where: T denotes a tread of the vehicle;
h denotes a roll center height;
Cp denotes an equivalent cornering power;
V denotes the given vehicle speed;
M denotes a sprung mass applied to the wheel;
X denotes a stroke amount of the wheel;
X' denotes a stroke speed of the wheel;
α denotes an initial toe angle; and
ε denotes a roll steer coefficient.

3. The vehicle suspension device as recited in claim 2, which includes a rear suspension device in which the lower limit of the ratio $\zeta_{scuff}$ of the scuff change-based apparent damping coefficient to the critical damping coefficient is 0.0299 or more, when the tire longitudinal spring constant of a rear wheel is 213 N/mm or less.

4. The vehicle suspension device as recited in claim 2, which includes a front suspension device in which the lower limit of the ratio $\zeta_{scuff}$ of the scuff change-based apparent damping coefficient to the critical damping coefficient is 0.0034 or more, when the tire longitudinal spring constant of a rear wheel is 213 N/mm or less.

5. The vehicle suspension device as recited in claim 2, wherein the upper limit of the ratio $\zeta_{scuff}$ of the scuff change-based apparent damping coefficient to the critical damping coefficient is 0.042.

* * * * *